(12) United States Patent  
Neubauer et al.

(10) Patent No.: US 9,116,348 B1  
(45) Date of Patent: Aug. 25, 2015

(54) LASER MAPPING TOOL AND WEAPON REPLACEMENT FIXTURE

(71) Applicants: Michael Neubauer, Denville, NJ (US); Narayan Bhagavatula, Ledgewood, NJ (US); Damien Marianucci, Secaucus, NJ (US); Stanley Kopacz, East Stroudsburg, PA (US)

(72) Inventors: Michael Neubauer, Denville, NJ (US); Narayan Bhagavatula, Ledgewood, NJ (US); Damien Marianucci, Secaucus, NJ (US); Stanley Kopacz, East Stroudsburg, PA (US)

(73) Assignee: The United States of America as Represented by the Secretary of the Army, Washington, DC (US)

( * ) Notice: Subject to any disclaimer, the term of this patent is extended or adjusted under 35 U.S.C. 154(b) by 211 days.

(21) Appl. No.: 13/948,604

(22) Filed: Jul. 23, 2013

Related U.S. Application Data

(60) Provisional application No. 61/708,805, filed on Oct. 2, 2012.

(51) Int. Cl.  
*G02B 26/10* (2006.01)  
*F41G 3/26* (2006.01)

(52) U.S. Cl.  
CPC .............. *G02B 26/10* (2013.01); *F41G 3/2655* (2013.01)

(58) Field of Classification Search  
None  
See application file for complete search history.

(56) References Cited

U.S. PATENT DOCUMENTS

| | | | | |
|---|---|---|---|---|
| 5,182,668 A | * | 1/1993 | Kawabata | ................ 359/218.1 |
| 2002/0148900 A1 | * | 10/2002 | Gurevich et al. | ........ 235/462.34 |
| 2011/0176192 A1 | * | 7/2011 | Matsuoka | ................ 359/204.1 |

FOREIGN PATENT DOCUMENTS

EP       1 790 938 AZ      *   5/2007

* cited by examiner

*Primary Examiner* — Stephen M Johnson  
(74) *Attorney, Agent, or Firm* — Henry S. Goldfine

(57) ABSTRACT

A platform mapping tool for mapping a weapon platform includes a mandrel inserted in one of a weapon barrel and a weapon replacement fixture barrel. The tool generates a laser cone centered on the bore centerline of the weapon. The laser cone illuminates a defined cone of dispersion of ammunition. Areas where the laser cone intersects the weapon platform correspond to undesirable weapon firing positions. The undesirable firing positions can be digitized and loaded into the weapon's fire control system.

19 Claims, 6 Drawing Sheets

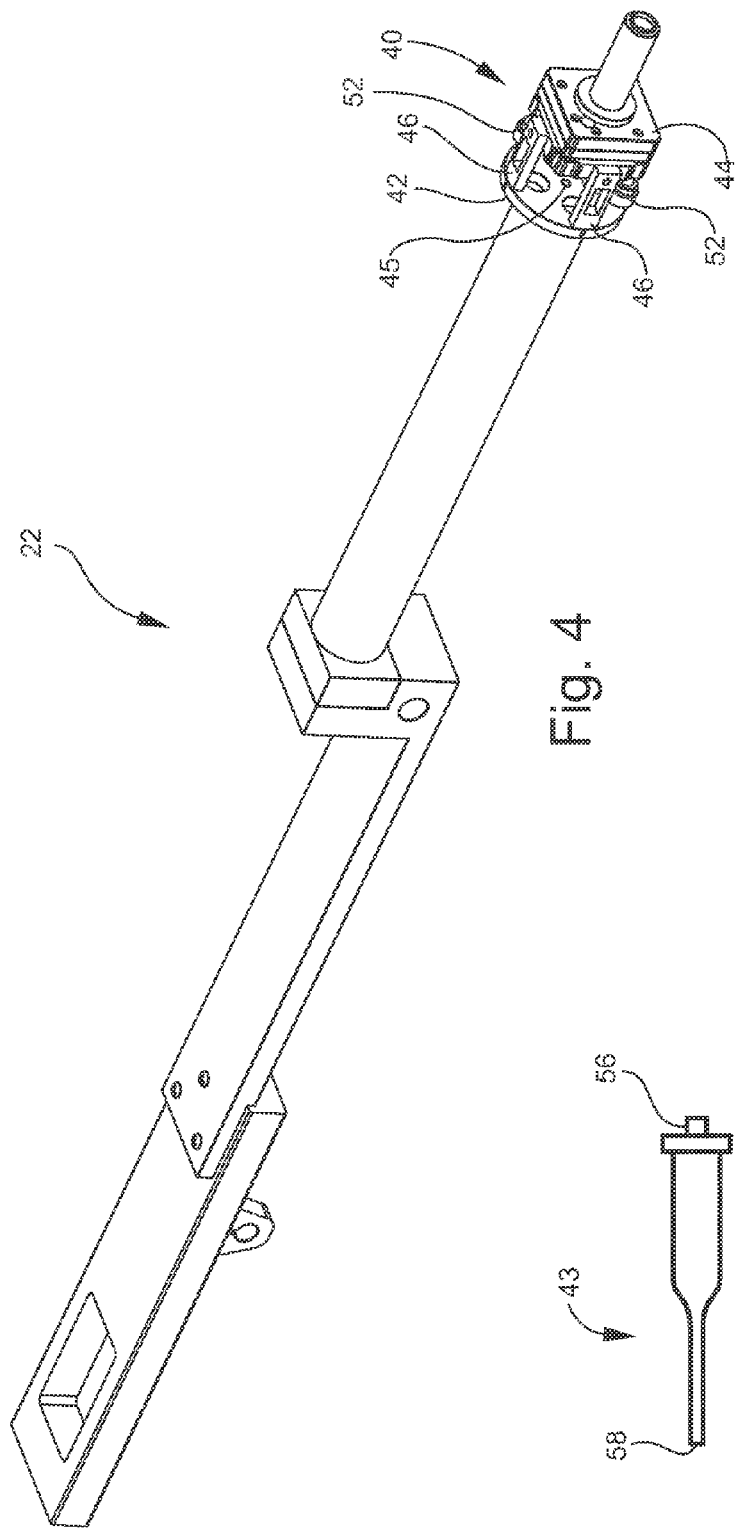

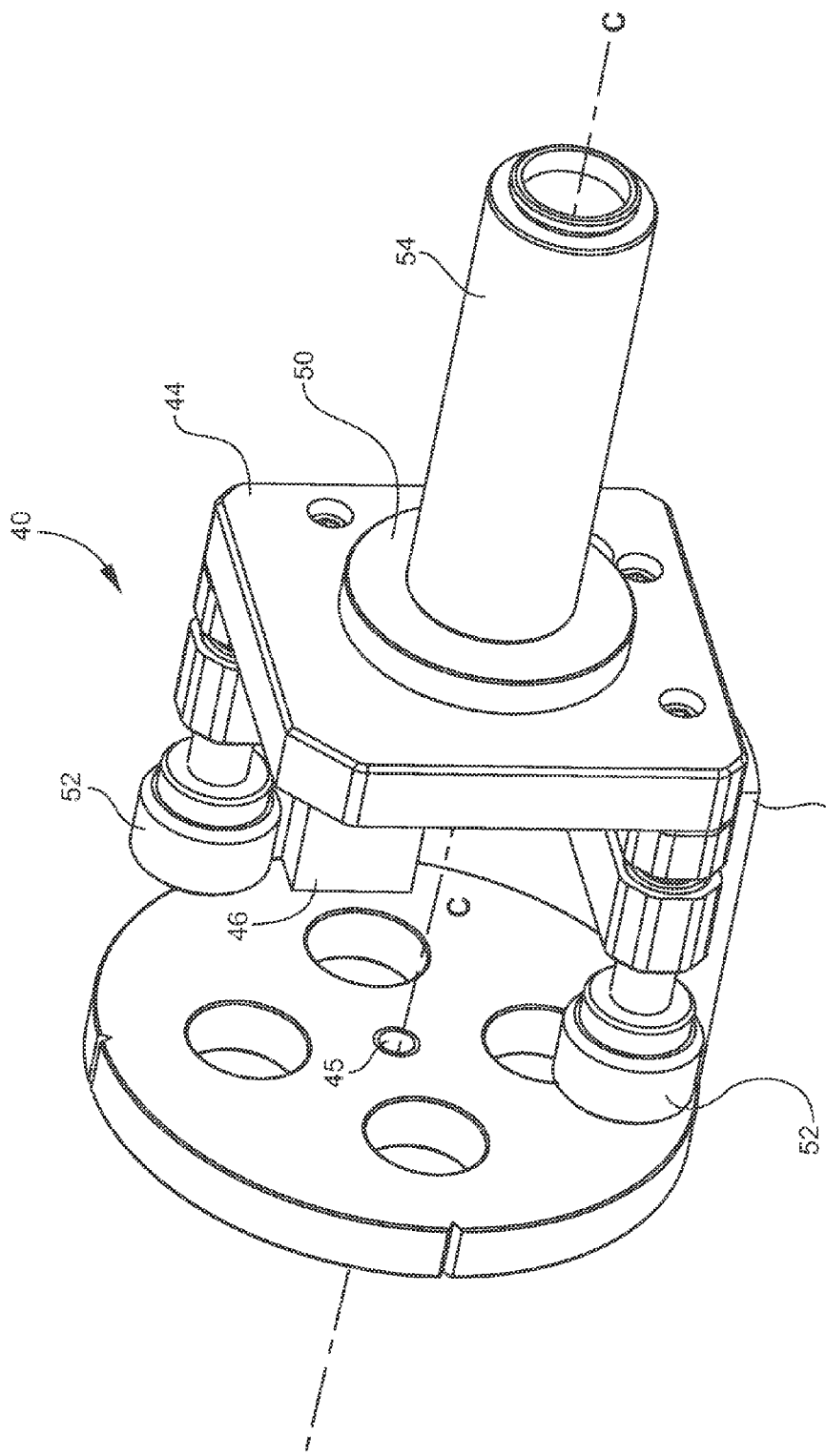

US 9,116,348 B1

LASER MAPPING TOOL AND WEAPON REPLACEMENT FIXTURE

STATEMENT OF GOVERNMENT INTEREST

The present application claims the benefit of priority of U.S. provisional patent application Ser. No. 61/708,805 filed on Oct. 2, 2012, which is incorporated by reference herein.

The inventions described herein may be manufactured, used and licensed by or for the United States Government.

BACKGROUND OF THE INVENTION

The invention relates in general to weapons, and in particular to weapons mounted on platforms.

A weapon may be mounted on a vehicle or on another type of platform. The vehicle or other platform may be on land, in the air, or at sea. The weapon must be mounted in such a way to prevent damage to the mounting platform caused by the ammunition fired from the weapon and/or caused by the weapon physically striking the platform. At the same time, it is desirable to maximize the safe firing arcs of the weapon. Thus, the weapon platform must be mapped from the perspective of the centerline of the bore of the weapon. The weapon platform map includes the various azimuths and elevations at which the weapon may be fired and traversed.

In the past, platform mapping was accomplished using an active or demilitarized weapon and a single beam laser. Obtaining a weapon to use for platform mapping can be difficult in some locations and may require extensive pre-planning. Weapons are not easily transported due to weight and security concerns. Additionally, active weapons require certified personnel to escort the weapon. And, a problem with single beam lasers is the small diameter cylindrical beam produced by the single beam lasers. A cylindrical beam does not accurately simulate the cone of dispersion of some fired ammunition, or other tolerance issues, such as a margin of safety.

The cone of dispersion is a conical space centered on the bore centerline of the weapon and extending outward from the weapon's muzzle. Using a single beam laser, a weapon may erroneously be determined to be safe to fire if the bore centerline does not intersect the weapon platform. Because of dispersed ammunition, the weapon may actually damage the platform when fired even if the bore centerline does not intersect the weapon platform.

Three-dimensional computer models of weapon platforms are not suitable because the models are often not current, accurate, or available. Equipment is often added to or customized for weapon platforms and the 3-D models of the basic platform do not reflect the final configuration of the weapon platform. Scanning devices may be used to create a contour map of a weapon platform, but the scanning devices are expensive, difficult to transport, and unnecessarily precise.

A need exists for a simple, effective, easily transportable apparatus for mapping a vehicle or other weapon platform to determine no-fire elevation/azimuth combinations and no-traverse elevation/azimuth combinations.

SUMMARY OF INVENTION

One aspect of the invention is a platform mapping tool. The platform mapping tool includes a base wheel having a central axis. An adjustable kinematic mount is spaced apart from and rigidly fixed to the base wheel. The kinematic mount is centered on the central axis. A laser cone generator is fixed to the kinematic mount and centered on the central axis. The laser cone generator includes a laser, a diffractive optical element, a lens tube, and lenses disposed in the lens tube. The lenses include first and second plano-convex lens and a plano-concave lens. The laser beam from the laser source is transformed by the diffractive optical element and the lenses into a diverging ring with an angular divergence that is invariant of a focus of the diverging ring.

The adjustable kinematic mount may include at least two diagonally opposed adjusters for collimating the laser beam.

A mandrel may be concentrically fixed to the base wheel on a side of the base wheel opposite the kinematic mount. The platform mapping tool may include a barrel with a bore therein. The mandrel may be inserted in the bore concentric with a centerline of the bore.

In one embodiment, the barrel is a weapon barrel and the mandrel is inserted in a muzzle of the weapon barrel.

In another embodiment, the barrel is a component of a weapon replacement fixture and is not a weapon barrel.

The weapon replacement fixture may include a receiver forward base removably fixed to the barrel and a receiver aft base removably fixed to the receiver forward base.

Another aspect of the invention is a method of mapping a platform for a weapon. The weapon has a bore centerline and a muzzle. The method includes providing a platform mapping tool having a laser cone generator. The laser cone generator projects a laser cone having an axis coincident with the bore centerline and an apex located substantially at a location of the muzzle of the barrel of the weapon. The laser cone is projected for a plurality of positions of the weapon. The method includes identifying a group of the plurality of positions in which the projected laser cone intersects the platform.

The invention will be better understood, and further objects, features and advantages of the invention will become more apparent from the following description, taken in conjunction with the accompanying drawings.

BRIEF DESCRIPTION OF THE DRAWINGS

In the drawings, which are not necessarily to scale, like or corresponding parts are denoted by like or corresponding reference numerals.

FIG. 4 is a perspective view of a platform mapping apparatus mounted to a weapon replacement fixture.

FIG. 5 is a perspective view of the platform mapping apparatus of FIG. 4.

FIG. 6 is a perspective view of a mandrel.

DETAILED DESCRIPTION

A weapon platform mapping apparatus includes an opto-mechanical assembly for projecting a laser cone. The laser cone is a right circular cone. The central axis of the laser cone is aligned with the location of the centerline of the bore of a weapon mounted on a platform. If the weapon is present on the platform, the opto-mechanical assembly is mounted to the weapon's barrel. If the weapon is not present on the platform, the opto-mechanical assembly is mounted to a weapon replacement fixture. In either case, the opto-mechanical assembly is placed at the location corresponding to the weapon's muzzle. The apex of the laser cone may be located axially distal of the actual muzzle location because of the standoff dimension of the mechanical mount assembly.

To map a weapon platform, the weapon or weapon replacement fixture, with the platform mapping apparatus attached thereto, is moved through various positions (azimuth/elevation combinations). At each position of the weapon or weapon replacement fixture, the laser cone projected by the platform mapping apparatus occupies or defines the space where the weapon's ammunition may travel after leaving the muzzle. This space may also include a margin of error beyond actual observed ammunition dispersion.

Weapon positions in which the laser cone intersects the platform are not allowable firing positions for the weapon. By moving the weapon or weapon replacement fixture through all possible positions of the weapon, one may determine the azimuth/elevation combinations for which firing or traversing the weapon may damage the platform. The azimuth/elevation combinations may be digitized and loaded into the weapon's fire control system to prevent the weapon from firing on and damaging the platform.

Figure 1:
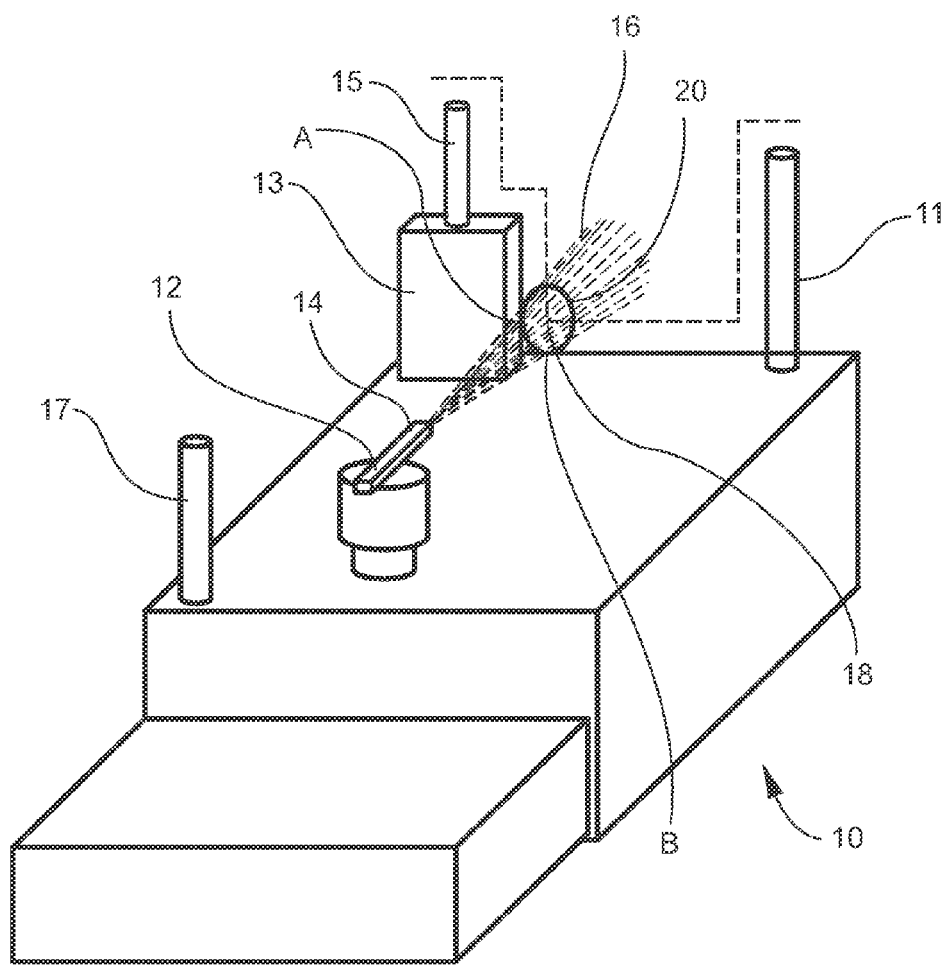
FIG. 1 is a schematic diagram illustrating a function of one embodiment of a weapon platform mapping apparatus.

FIG. 1 is a schematic diagram illustrating the function of one embodiment of a weapon platform mapping apparatus. A weapon platform 10 includes a weapon 12 mounted thereon. Weapon platform 10 may be stationary or movable. Weapon platform 10 may be part of a land, air, sea, or space vehicle. Platform 10 may include various structures 11, 13, 15, 17. Structures 11, 13, 15, 17 shown in FIG. 1 are exemplary only and are meant to show that platform 10 may include any number and shape of structures that must be accounted for when mapping platform 10.

Figure 2:
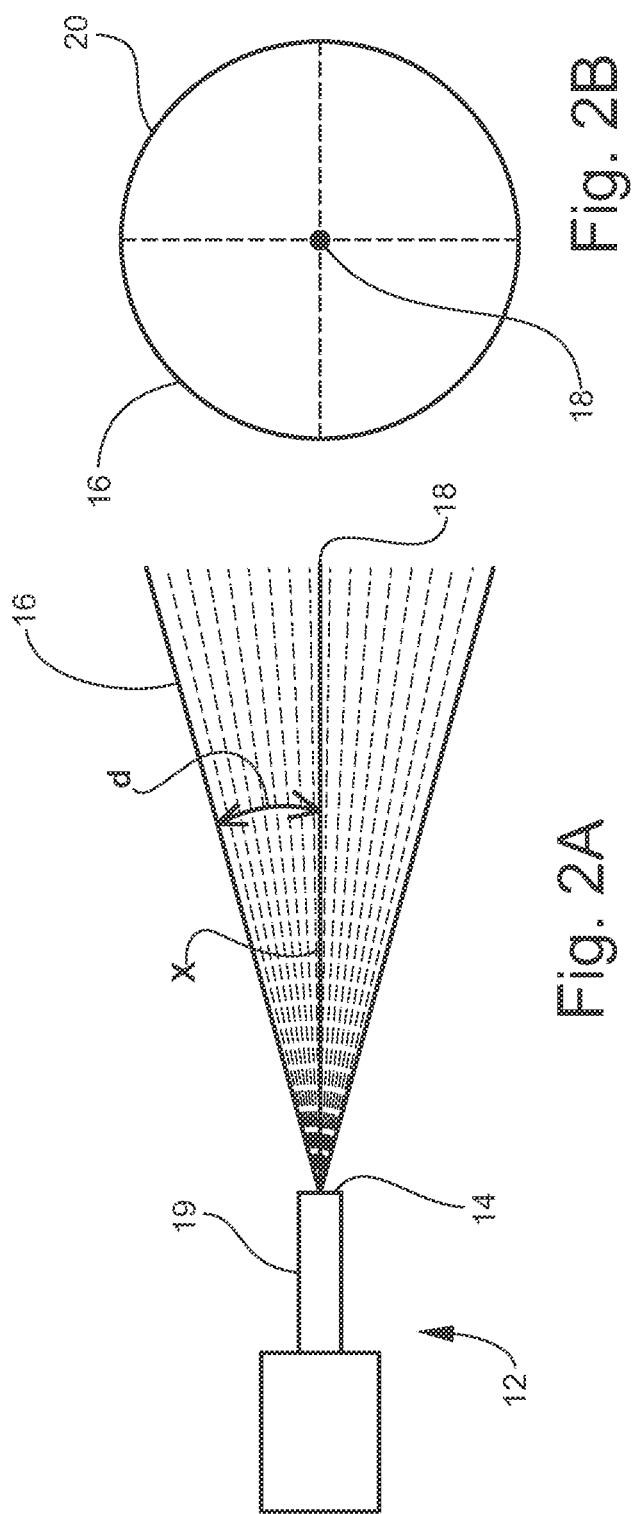
FIG. 2A is a schematic side view of a laser cone.
FIG. 2B is a schematic end view of a laser cone.

Mounted at the location of the muzzle 14 of weapon 12 is an opto-mechanical assembly (described in detail below) that generates a right circular laser cone 16. FIG. 2A is a schematic side view of laser cone 16 and FIG. 2B is a schematic end view of laser cone 16. The cone angle d is shown in FIG. 2A. At any axial location along laser cone 16, cone 16 has a center 18 and an annular perimeter or ring 20. Center 18 is collinear with the bore centerline X of barrel 19 of weapon 12. In FIG. 1, ring 20 abuts or is tangent to platform 10 at points A and B and does not intersect platform 10. Thus, the position of weapon 12 in FIG. 1 is an allowable firing position. The dotted line in FIG. 1 represents the closest allowable firing positions of the bore centerline to platform 10 for the portion of platform 10 near structures 13, 15, and 11.

For various reasons, weapon 12 may not always be available or may not be mounted on platform 10. In lieu of weapon 12, a weapon replacement fixture may be used when mapping platform 10. Functionally, the weapon replacement fixture must provide a mounting location for the opto-mechanical laser assembly. When the opto-mechanical laser assembly is mounted to the weapon replacement fixture, the laser assembly's spatial location must be the same as when the laser assembly is mounted to weapon 12, for all possible azimuth/elevation combinations of weapon 12.

Figure 3:
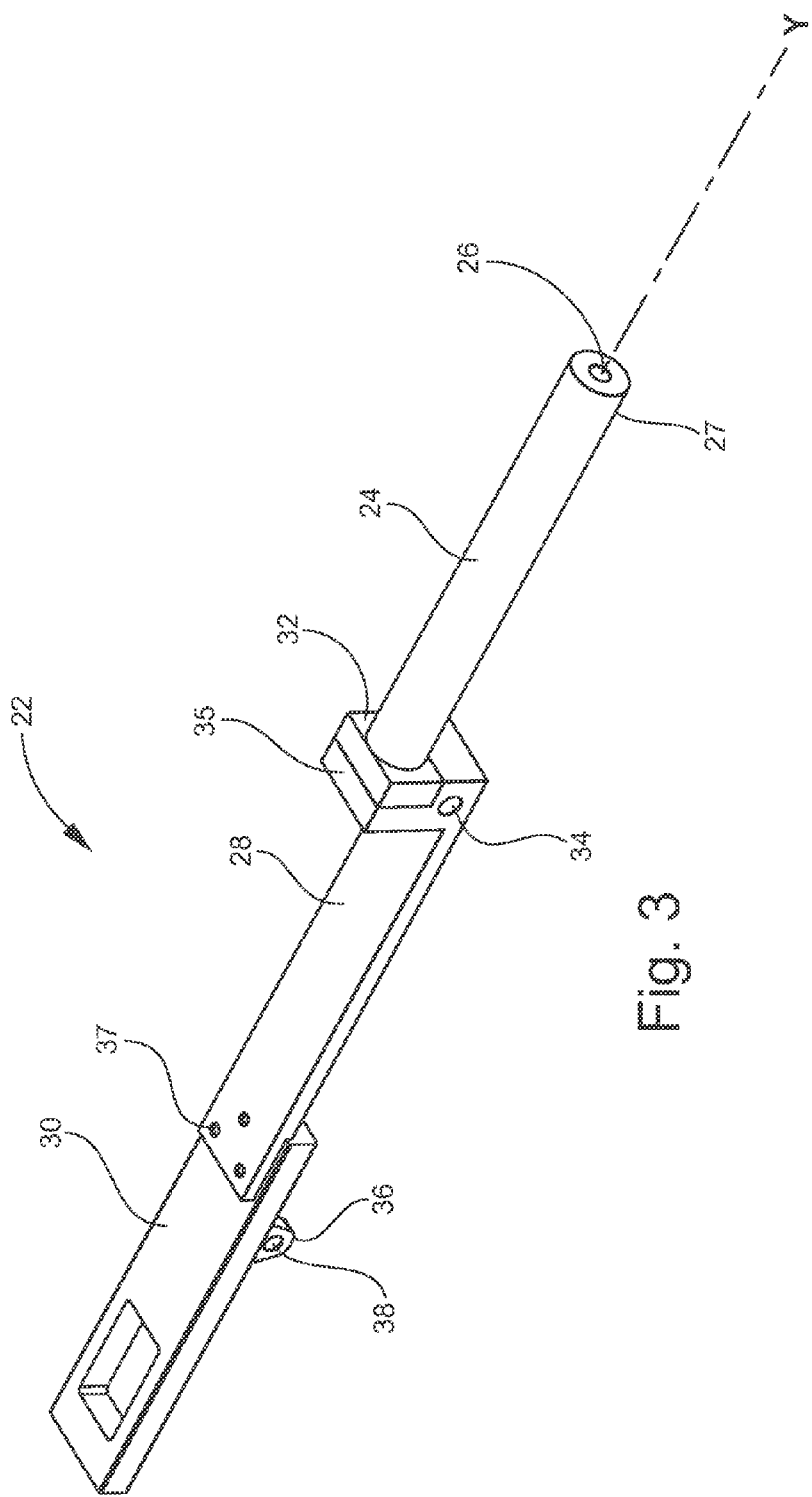
FIG. 3 is a perspective view of one embodiment of a weapon replacement fixture.

FIG. 3 is a perspective view of one embodiment of a weapon replacement fixture 22. Fixture 22 includes a barrel 24, a receiver forward base 28 removably fixed to barrel 24, and a receiver aft base 30 removably fixed to receiver forward base 28. Barrel 24 includes a bore 26 with a bore centerline Y, a muzzle 27, and a barrel base 32. Ammunition is not fired through barrel 24. Barrel 24 is simply a hollow cylinder with a smooth bore 26. Bore 26 of barrel 24 need not be the same caliber as weapon 12. The spatial location of muzzle 27 of barrel 24 on platform 10 must be the same as that of muzzle 14 of weapon 12 and the centerline Y of bore 26 must spatially coincide with bore centerline X of weapon 12.

Barrel base 32 may be fixed to receiver forward base 28 using, for example, removable fasteners (not shown). The fasteners may be disposed in openings in barrel base 32 and the abutting portion 35 of receiver forward base 28. Receiver forward base 28 may be fixed to receiver aft base 30 using fasteners 37 disposed in corresponding openings in forward and aft bases 28, 30. Receiver aft base 30 may include a pair of lugs or bosses 36 having openings 38 therein for pinning or fixing aft base 30 to weapon platform 10. Receiver forward base 28 may include an opening 34 for pinning or fixing base 28 to weapon platform 10. Depending on the type of weapon 12, the configuration of fixture 22 may vary. However, the modular nature of fixture 22 is desirable so that it can be easily disassembled, packed in a case, and carried by a person on a commercial passenger airplane. To minimize weight, fixture 22 may be made of, for example, aluminum.

FIG. 4 is a perspective view of one embodiment of a platform mapping apparatus or tool 40 mounted to weapon replacement fixture 22. FIG. 5 is a perspective view of platform mapping tool 40. Platform mapping tool 40 includes a base wheel 42 having a central axis C. An adjustable kinematic mount 44 is spaced apart from base wheel 42 and fixed to base wheel 42. Mount 44 may be fixed to base wheel 42 using, for example, standoffs 46. Kinematic mount 44 is centered on central axis C. An example of a suitable kinematic mount 44 is KM100T SM1 threaded kinematic mount available from Thorlabs, Inc., P.O. Box 266, Newton, N.J. A laser cone generator 50 including a lens tube 54 is fixed to kinematic mount 44. Laser cone generator 50 is centered on central axis C. Mount 44 may include two diagonally opposed threaded adjusters 52 for adjusting the position of laser cone generator 50. Adjusters 52 may be tilt/tip adjusters. Various types of suitable adjustment mechanisms are available for kinematic mounts. Adjusters 52 are merely exemplary of such suitable adjustment mechanisms.

Mapping apparatus 40 may include a mandrel 43 (FIG. 6). One end 56 of mandrel 43 may be fixed to an opening 45 in base wheel 42 by, for example, threading. The other end 58 of mandrel 43 is inserted in weapon barrel 19 or weapon replacement fixture barrel 24. Mandrel 43 is concentric with central axis C. For some calibers, for example, .50 caliber or less, the outside diameter of mandrel 43 may be just less than the inside diameter of weapon barrel 19 or the inside diameter of weapon replacement fixture barrel 24. For larger calibers, mandrel 43 may include spring-loaded spacers that center mandrel 43 in the barrel.

Figure 7:
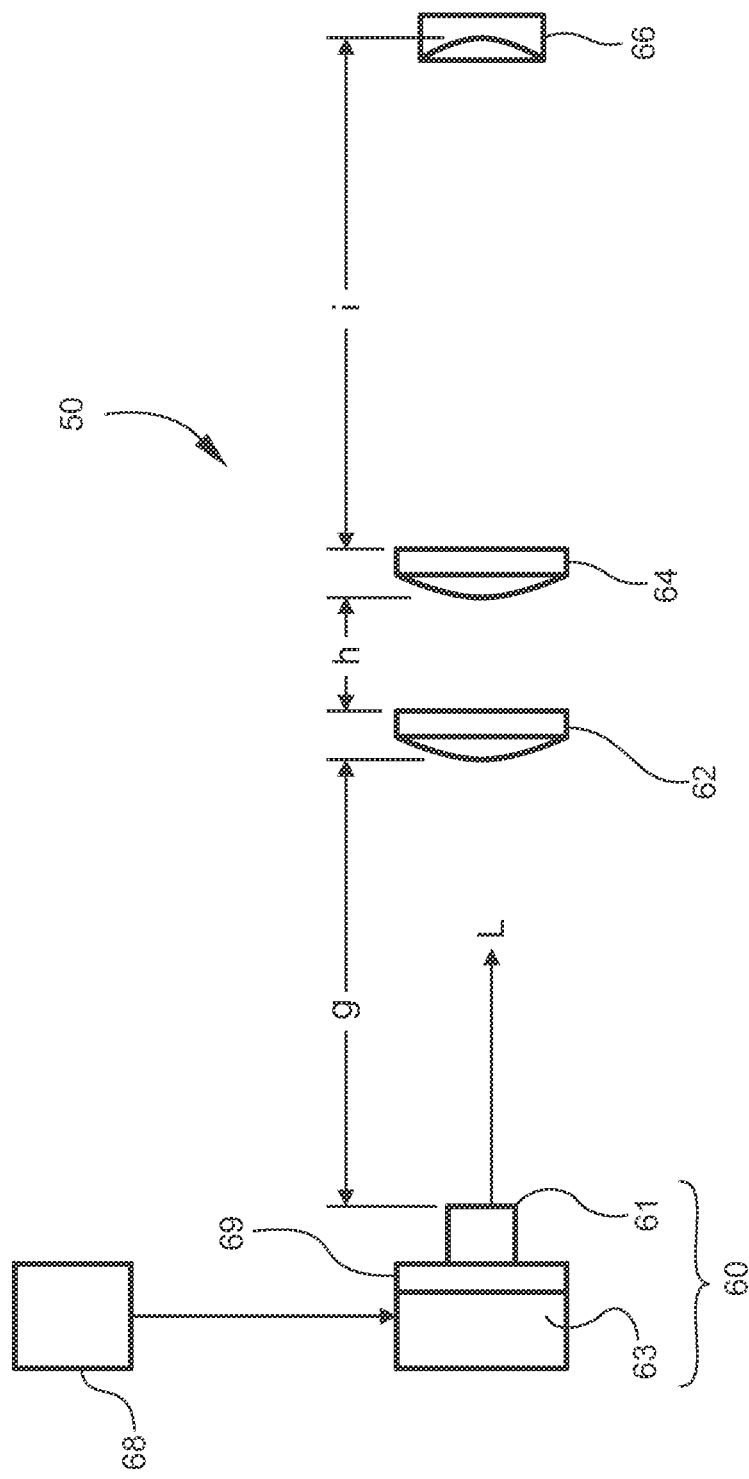
FIG. 7 is a schematic diagram of a laser cone generator.

The components of laser cone generator 50 are shown schematically in FIG. 7. A laser assembly 60 includes a laser 63, a diffractive optical element 69 and an exit aperture 61. A power supply 68 for laser 63 may be, for example, a battery pack or a power cord inserted in a power outlet. The diffractive optical element or hologram 69 alters the laser beam from a collimated (parallel) beam to a diverging ring (cone) and a central collimated beam. The combined laser 63 and diffractive optical element 69 is a commercially available off-the-shelf item. The angular divergence of the ring or cone is initially defined by the diffractive optical element 69.

After exiting aperture 61, light beam L is projected through first and second plano-convex lenses 62, 64 and a plano-concave lens 66. Lenses 62, 64, and 66 are disposed in lens tube 54. The lens assembly is telecentric. Plano-convex lenses 62, 64 act as a single lens to establish an effective focal length for achieving the desired beam divergence (cone angle d shown in FIG. 2A). The lens assembly redefines the initial angular divergence of the cone (established by the diffractive optical element 69) to the desired divergence (angle d) for mapping. In one embodiment, the cone angle d is six degrees. The cone angle d may be changed by using a different set of plano-convex lenses.

Plano-concave lens 66 focuses beam L without affecting its divergence, to achieve the best possible laser cone resolution. The focus of the cone corresponds to the radial width of the annulus or ring 20 that defines the perimeter of the cone. Greater focus corresponds to a thinner ring 20. Regardless of the degree of focus (i.e., width of ring 20), the angle d is always maintained because of the telecentric nature of the lens assembly. In other words, the angular divergence of a circle that is centered in the width of the annulus or ring 20 is invariant of the width of the ring 20.

In an exemplary embodiment of the invention with a cone angle d of six degrees, plano-convex lens 62 has the properties: R1=26.25 mm; R2=infinity; thickness=2.5 mm; diameter=12.7 mm; plano-convex lens 64 has the properties: R1=23 mm; R2=infinity; thickness=2.75 mm; diameter=12.7 mm; and plano-concave lens 66 has the properties: 7.07 mm; R2=infinity; thickness=2.25 mm; diameter=9 mm. In this exemplary embodiment, and referring to FIG. 7, distance g from the laser aperture 61 to the convex surface of lens 62 is 22.3 mm; distance h from the planar rear surface of lens 62 to the convex surface of lens 64 is 3.5 mm; and distance i from the planar rear surface of lens 64 to the concave surface of lens 66 is 11.75 mm.

While the invention has been described with reference to certain embodiments, numerous changes, alterations and modifications to the described embodiments are possible without departing from the spirit and scope of the invention as defined in the appended claims, and equivalents thereof.

What is claimed is:

1. A platform mapping tool, comprising:
   a base wheel having a central axis;
   an adjustable kinematic mount spaced apart from and rigidly fixed to the base wheel, the kinematic mount being centered on the central axis; and
   a laser cone generator fixed to the kinematic mount and centered on the central axis, the laser cone generator including a laser, a diffractive optical element, a lens tube, and lenses disposed in the lens tube, the lenses including first and second plano-convex lens and a plano-concave lens wherein a laser beam from the laser source is transformed by the diffractive optical element and the lenses into a diverging ring with an angular divergence that is invariant of a focus of the diverging ring.

2. The tool of claim 1, wherein the adjustable kinematic mount includes at least two diagonally opposed adjusters for collimating the laser beam.

3. The tool of claim 2, further comprising a mandrel concentrically fixed to the base wheel on a side of the base wheel opposite the kinematic mount.

4. The tool of claim 3, wherein the at least two diagonally opposed adjusters are tip/tilt adjusters.

5. The tool of claim 3, further comprising a battery power supply connected to the laser source.

6. The tool of claim 3, further comprising a barrel with a bore therein, the mandrel being inserted in the bore concentric with a centerline of the bore.

7. The tool of claim 6, wherein the barrel is a weapon barrel and the mandrel is inserted in a muzzle of the weapon barrel.

8. The tool of claim 6, wherein the barrel is a component of a weapon replacement fixture and is not a weapon barrel.

9. The tool of claim 8, wherein the weapon replacement fixture includes a receiver forward base removably fixed to the barrel and a receiver aft base removably fixed to the receiver forward base.

10. A platform mapping tool, comprising:
    a base wheel having a central axis;
    an adjustable kinematic mount spaced apart from and rigidly fixed to the base wheel, the kinematic mount being centered on the central axis and including at least two diagonally opposed adjusters for collimating the laser beam;
    a laser cone generator fixed to the kinematic mount and centered on the central axis, the laser cone generator including a laser, a diffractive optical element, a lens tube, and lenses disposed in the lens tube, the lenses including first and second plano-convex lens and a plano-concave lens wherein a laser beam from the laser source is transformed by the diffractive optical element and the lenses into a diverging ring with an angular divergence that is invariant of a focus of the diverging ring; and
    a power supply connected to the laser source.

11. The tool of claim 10, further comprising a mandrel concentrically fixed to the base wheel on a side of the base wheel opposite the kinematic mount.

12. The tool of claim 11, further comprising a barrel with a bore therein, the mandrel being inserted in the bore concentric with a centerline of the bore.

13. The tool of claim 12, wherein the barrel is a weapon barrel and the mandrel is inserted in a muzzle of the weapon barrel.

14. The tool of claim 12, wherein the barrel is a component of a weapon replacement fixture and is not a weapon barrel.

15. The tool of claim 14, wherein the weapon replacement fixture includes a receiver forward base removably fixed to the barrel and a receiver aft base removably fixed to the receiver forward base.

16. An apparatus, comprising:
    a weapon platform;
    one of a weapon and a weapon replacement fixture mounted on the weapon platform; and
    the tool of claim 3 wherein the mandrel is inserted in one of a barrel of the weapon and a barrel of the weapon replacement fixture.

17. A method of mapping a platform for a weapon, the weapon having a bore centerline and a muzzle, the method comprising:
    providing the tool of claim 3;
    using the laser cone generator, projecting a laser cone having an axis coincident with the bore centerline and an apex located substantially at a location of the muzzle of the barrel of the weapon;
    repeating the projecting step for a plurality of positions of the weapon; and
    identifying a group of the plurality of positions in which the projected laser cone intersects the platform.

18. The method of claim 17, further comprising, after the providing step, inserting the mandrel into one of the barrel of the weapon and a barrel of a weapon replacement fixture, the barrel of the weapon replacement fixture having a bore centerline that is coincident with the bore centerline of the barrel of the weapon.

19. The method of claim 18, further comprising, after the inserting step, adjusting the kinematic mount to center the laser beam along the bore centerline of the barrel of the weapon.

* * * * *